United States Patent Office 3,736,277
Patented May 29, 1973

3,736,277
METHOD OF RECLAIMING PRIMER PAINT OVERSPRAY SLUDGE
Howard S. Bender, Detroit, Mich., assignor to General Motors Corporation, Detroit, Mich.
No Drawing. Filed Apr. 21, 1971, Ser. No. 136,203
Int. Cl. B29h 19/00; C08f 47/24; C08g 53/22
U.S. Cl. 260—22 EP
3 Claims

ABSTRACT OF THE DISCLOSURE

Primer paint overspray sludge is washed, dried and its thermosetting resin binder fully cured. The dry solids are ground to form filler particles of 200 mesh or smaller. They are then mixed with a viscous liquid thermosetting grinding resin and further comminuted until at least 90% of the particles have been reduced to one to five microns. This grinding resin-ultrafine filler particle mixture is mixed with additional thermosetting binder resin and solvent to obtain a suitable sprayable primer paint.

---

This invention relates to the reclamation of wet overspray primer paint sludge. More particularly, this invention relates to the reconstituting of such sludge into ultrafine pigment and filler particles suitable for reformulating with thermosetting binder resin and solvent to make up a reusable primer paint.

In paint spraying operations some of the paint spray typically misses the article to be coated. Most of the solvent vaporizes. It is common practice to entrain and agglomerate these overspray solids in a water curtain continuously flowing down the sides of the paint booth. The water-paint mixture is pumped to a holding tank where the paint separates as a sludge on the surface of the water.

Heretofore primer paint sludge has typically been dealt with in one of two ways. Sometimes the agglomerated sludge is simply skimmed from the water, pressed on a filter to remove the bulk of the water, and then discarded as land fill material. Others have attempted to reclaim the thermosetting resin from the sludge as soon as possible before substantial curing or degradation of the binder resin occurs. Such processing is depicted, for example, in U.S. Pat. No. 2,702,282. Recovery of the thermosetting binder resin, however, is complicated by the fact that it is continually curing. Therefore, different portions of accumulated sludge are nonuniformly self-cured or degraded and it is difficult to obtain a reclaimed product of uniform consistency without grading or separating undesirable portions of the sludge.

It is an object of the present invention to provide a method of reclaiming oversprayed paint sludge containing a thermosetting binder, regardless of the state of crosslinking or degradation of the binder, as a useful pigment or filler in a reformulated primer paint.

It is a more specific object of the present invention to provide a method of reclaiming primer paint sludge containing a thermosetting resin binder and suitable pigments and fillers by drying the sludge and fully curing the binder so that it may ultimately be employed as a pigmentized filler and reformulated primer paint regardless of the state of degradation of the sludge.

In accordance with a preferred embodiment of my invention, these and other objects and advantages thereof are accomplished by first filtering or otherwise suitably separating the bulk of the water from a wet paint sludge containing a thermosetting resin binder as well as pigments and fillers. The moist sludge is then washed with water to remove any water soluble agglomeration salts which have been employed to originally cause the oversprayed paint to coalesce. The wet sludge is then heated at a temperature of about 210° to 250° F. to evaporate residual water and fully cure the thermosetting resin binder. This drying and curing may be undertaken in a circulating air oven and, if necessary, completed in a vacuum drying oven. The hard, dry lumps of sludge are then ground or pulverized by conventional means to an average particle size capable of being passed through a standard 200 mesh screen. This finely divided powder, comprising fully cured thermoset resin, pigments and filler materials conventionally employed in primer paints, may now be characterized as a filler. To the finely divided filler is added a suitable viscous liquid thermosetting grinding resin such as, for example, a long oil, alkyd resin. In general, approximately one part of the grinding resin per eight to ten parts filler particles is suitable. A solvent, such as xylene, is added to the mixture so that the flow point of the filler-binder paste is reached. This flowable, viscous mixture is then shaken with steel shot or otherwise sheared and comminuted so as to further reduce the particle size of the filler to an average dimension of one to five microns. To this filler-binder paste are then added suitable quantities of additional thermosetting binder resin and solvent vehicle to reformulate a useful and preferably sprayable primer paint composition.

Other objects and advantages of my reclamation process will become more apparent from a detailed description thereof which follows. A specific example will further assist in illustrating how the process is conducted.

Approximately fifteen pounds of wet primer sludge were collected from a primer spray booth. The primer paint initially comprised 75 parts of a medium oil length epoxy ester resin and about 25 parts pigments and filler, such as red iron oxide, barium sulfate, clay, titanium dioxide, red silico-chromate and carbon black. The epoxy ester resin was a reaction product of bisphenol-A, epichlorohydrin and tall oil fatty acids. The sludge was formed when oversprayed primer paint from a paint spray gun missing an automobile body struck the water curtain flowing down the sides of the paint booth. The water curtain contained agglomeration chemicals, such as sodium carbonate, trisodium phosphate and the like, which caused this atomized paint spray to coalesce and form the sludge. The sludge was then skimmed from the surface of the water in an accumulation tank and washed thoroughly with a total of 23.8 liters of distilled water in eight separate washings to remove all traces of the agglomeration chemicals. The sludge was filtered after each washing.

The washed sludge was then dried in an air circulating oven at 230° F. for sixteen hours, and finally vacuum dried at 212° F. for about eight hours. This heating served a dual purpose of removing the final amount of water and completely crosslinking the primer thermosetting resin.

The hard, dry lumps of sludge were then pulverized in a pulverizing machine using a screen having openings of thirteen mils or less to an average particle size of less than about 75 microns. This material would pass through a standard 200 mesh screen. Finely divided powder of this character was found necessary to ultimately produce a satisfactory reclaimed primer paint. This powder was found to contain about 26% by weight conventional pigment and filler, and 74% by weight crosslinked resin. A yield of 2,500 grams of pulverized powder was obtained. It could be characterized as a filler or pigmentized filler, the crosslinked resin of course no longer being suitable as a paint film binder. The washing step for removal of the agglomeration chemicals could optionally have been carried out on this dry, pulverized powder.

71.4 grams of a xylene solution of a long oil length alkyd grinding resin (50 grams resin) were mixed with 400 grams of the pulverized powder. This alkyd resin solution is sold under the trade name "Duraplex C–55X." This viscosity of the solution was 4,630 cps. at 25° C. About 4.7 grams of Alkaterge-T dispersing agent were added. Finally, xylene was added to the mixture so that the flow point of the pigment paste was reached. The total volume of the mixture was about one quart. This mixture was then shaken with steel shot for three hours in a one gallon can until a Hegman particle size determination of six was obtained. The filler-to-grinding resin ratio of this paste was eight to one.

To the paste was then added 286 grams of a xylene solution of a medium oil length epoxy ester (49% liquid resin) and 248 grams of a xylene solution of melamine-formaldehyde resin (64% liquid resin). The epoxy ester resin, which was a reaction product, of bisphenol-A, epichlorohydrin and tall oil fatty acids, was added to the formulation in this instance to provide a high durability primer paint film. The melamine-formaldehyde resin was employed in this instance to increase the cure rate of the final composition. The respective amounts of these three thermosetting resins were such that they were mutually compatible and in total they reduced the filler-to-binder resin ratio to 1.15 to 1. This paint formulation was then reduced to a spray viscosity by the addition of xylene to a total volume of about ⅝ gallon so that the viscosity in a Fisher #2 viscosity cup was sixteen to nineteen seconds.

No additional primer pigments were added to this formulation beyond the amount present in the reclaimed sludge. This reformulated and reconstituted primer paint was considered suitable for testing as an underbody primer. The reclaimed paint was tested alone and as mixed in concentrations of 10% and 20% by nonvolatiles weight with commercially available alkyd resin underbody primer. The commercially available underbody primer was employed as the control material in the tests. Zinc phosphated (Hooker Chemical Company Bonderite 40) unpolished steel panels were used as the substrate for these tests. A number of panels were coated with the reclaimed primer alone. A number were painted with the 10% mixture and 20% mixture of the reclaimed primer in the commercially available underbody primer, and some panels were coated with the commercially available underbody primer. All panels were sprayed to a thickness of one mil.

The painted and dried panels were subjected to the following comparison tests: salt spray face rust (ASTM–B–117), salt spray scribe (ASTM–B–117) and gravelometer (SAE J400). Those panels coated with the reclaimed primer underbody material and those coated with the paint mixtures containing the reclaimed material demonstrated better face rust resistance than did the panels coated with the commercially available underbody primer. Those panels coated with reclaimed primer or the mixtures containing reclaimed primer were equal in performance to the commercially available underbody primer in the salt spray scribe tests. Those panels coated with reclaimed primer were slightly inferior in chip ressitance to those coated with the commercially available underbody primer, but nevertheless were rated fair and acceptable. Accordingly, it was deemed that the reclaimed paint sludge could be employed as a pigment-filler material in a reformulated primer paint without the addition of any other pigments and employed in a priming capacity. Obviously the addition of other corrosion resistance pigments well known in the art would further enhance the corrosion resistance and durability, and thus the applicability of the reclaimed paint.

A number of grinding resins are known in the art of paint making and formulation. In general, such grinding resins are suitable for use in my recovery process. Preferably, one part by weight of grinding resin is mixed with five to ten parts by weight of the particle mixture. When an epoxy ester-based primer is being reclaimed I prefer the use of a liquid alkyd grinding resin because of its compatibility with the reclaimed primer sludge particles. Suitable alkyd grinding resins are those having an oil length of 50% to 65% by weight, a diacid content of 24% to 33% by weight of an acid number of four to eighteen. Suitable principal fatty acids include linseed oil, castor oil or soya fatty acids. The highly viscous liquid resin is generally employed dissolved in a solvent such as xylene wherein the solution contains 50% to 70% by weight resin and has a viscosity at 25° C. of 1,290 to 14,800 centipoise.

A large number of thermosetting binder resins are known in the paint formulating art. Such binder resins may be used in a paint formulation with filler particles recovered from primer sludge by my process. However, a binder resin must be selected so as to be compatible with the grinding resin that has been employed and the recovered filler particles. Suitable binder resins for use when an alkyd grinding resin is employed include epoxy ester binder resins which are the reaction product of bisphenol-A, epichlorohydrin and tall oil or dehydrated castor oil fatty acids. These viscous liquid resins are usually added dissolved in a suitable solvent such as xylene. The oil preferred length of the epoxy ester resin is 35% to 40% by weight and the acid number is preferably two to five.

Melamine-formaldehyde and urea-formaldehyde thermosetting binder resins having an acid number of two to five may also be employed.

A quantity of binder resin is added to the grinding resin-particle mixture until a total of one part by weight of resin per one to two parts by weight of particles is obtained.

Finally, a suitable amount of a solvent vehicle, such as xylene, is added to the binder-filler-pigment mixture to disperse the solids so that they may be applied to a surface, such as by spraying or other suitable means.

While my invention has been described in terms of a few specific preferred embodiments thereof, it will be appreciated that other forms thereof could readily be adapted by one skilled in the art. Accordingly, the scope of my invention is to be considered limited only by the following claims.

What is claimed is:

1. A method of preparing a useful prime coat paint from primer paint sludge formed by entraining and agglomerating oversprayed paint and water, said primer paint initially comprising a thermosetting epoxy ester binder resin and suitable pigments and fillers, comprising
   separating said sludge from the bulk of said water,
   heating the wet sludge at a temperature suitable to dry it and to completely crosslink said epoxy ester binder resin,
   comminuting the dry thermoset resin-pigment mixture to fine particles capable of being passed through a standard 200 mesh screen,
   mixing one part by weight of a viscous liquid thermosetting alkyd grinding resin with five to ten parts by weight of said fine particles,
   shearing said particle-grinding resin mixture to reduce the average size of said particles to one to five microns,
   adding an additional quantity of thermosetting binder resin to the grinding resin-fine particle mixture to obtain a ratio of one part by weight total resins to one to two parts by weight particles,
   said binder resin being chemically compatible with said thermosetting alkyd grinding resin,
   and adding a solvent to the binder-resin particle mixture in sufficient quantities to obtain a sprayable paint.

2. A method of preparing a useful prime coat paint from primer paint sludge formed by entraining and agglomerating oversprayed paint and water, said primer paint initially comprising a thermosetting epoxy ester binder resin and suitable pigments and fillers, comprising separating said sludge from the bulk of said water, heating the wet sludge at a temperature suitable to dry it and to completely crosslink said epoxy ester binder resin, comminuting the dry thermoset resin-pigment mixture to fine particles capable of being passed through a standard 200 mesh screen, mixing one part by weight of a viscous liquid thermosetting alkyd grinding resin with five to ten parts by weight of said fine particles, shearing said particle-grinding resin mixture to reduce the average size of said particles to one to five microns, adding an additional quantity of thermosetting binder resin to the grinding resin-fine particle mixture to obtain a ratio of one part by weight total resins to one to two parts by weight particles, said binder resin being selected from the group consisting of epoxy ester binder resins, melamine-formaldehyde binder resins and urea-formaldehyde binder resins, and adding a solvent to the binder-resin particle mixture in sufficient quantities to obtain a sprayable paint.

3. A method of preparing a useful prime coat paint from primer paint sludge formed by entraining and agglomerating oversprayed paint and water, said primer paint initially comprising a thermosetting epoxy ester binder resin and suitable pigments and fillers, comprising separating said sludge from the bulk of said water, heating the wet sludge at a temperature of about 210° to 250° F. to dry it and to completely crosslink said epoxy ester binder resin, comminuting the dry thermoset resin-pigment mixture to fine particles capable of being passed through a standard 200 mesh screen, mixing one part by weight of a viscous liquid thermosetting alkyd grinding resin with five to ten parts by weight of said fine particles, shearing said particle-grinding resin mixture to reduce the average size of said particles to one to five microns, adding an additional quantity of thermosetting binder resin to the grinding resin-fine particle mixture to obtain a ratio of one part by weight total resins to one to two parts by weight particles, said binder resin being selected from the group consisting of epoxy ester binder resins, melamine-formaldehyde binder resins and urea-formaldehyde binder resins, and adding a solvent to the binder-resin particle mixture in sufficient quantities to obtain a sprayable paint.

References Cited

UNITED STATES PATENTS

| | | | |
|---|---|---|---|
| 2,702,282 | 2/1955 | Shamp | 260—2.3 |
| 2,640,035 | 5/1953 | Brown et al. | 260—2.3 |
| 2,968,638 | 1/1961 | Meckler | 260—21 |
| 3,027,599 | 4/1962 | Pluhacek et al. | 260—2.3 |
| 3,251,798 | 5/1966 | Pollien | 260—34.2 |
| 3,492,256 | 1/1970 | Kapalko et al. | 260—830 R |
| 3,515,575 | 6/1970 | Arnold | 117—102 R |
| 3,562,198 | 2/1971 | Slocombe | 260—34.2 |
| 3,600,346 | 8/1971 | Spatola | 260—22 R |
| 3,624,009 | 11/1971 | Sussman | 260—2.3 |

DONALD E. CZAJA, Primary Examiner

R. W. GRIFFIN, Assistant Examiner

U.S. Cl. X.R.

117—102 R, 132 B, 132 BE, 161 K; 260—2.3, 18 EP, 34.2